United States Patent [19]

Lutz et al.

[11] Patent Number: 4,591,039

[45] Date of Patent: May 27, 1986

[54] CLUTCH RELEASE GROUP FOR A ROTARY CLUTCH ASSEMBLY

[75] Inventors: Dieter Lutz, Schweinfurt; Wolfgang Thieler, Hassfurt-Uchenhofen, both of Fed. Rep. of Germany

[73] Assignee: SACHS-Systemtechnik GmbH, Schweinfurt, Fed. Rep. of Germany

[21] Appl. No.: 470,624

[22] Filed: Feb. 28, 1983

[30] Foreign Application Priority Data

Mar. 6, 1982 [DE] Fed. Rep. of Germany ....... 3208185

[51] Int. Cl.⁴ .............. F16D 25/08; F16D 13/75; F01B 19/04; F16J 3/02
[52] U.S. Cl. ................. 192/91 A; 92/98 D; 92/105; 192/85 CA; 192/88 A; 192/98; 192/111 A
[58] Field of Search ............ 192/85 CA, 88 A, 91 A, 192/98, 111 A; 92/49, 50, 98 D, 105

[56] References Cited

U.S. PATENT DOCUMENTS

| 2,089,472 | 8/1937 | Geyer | 192/85 CA |
|---|---|---|---|
| 3,202,247 | 8/1965 | Schmidt et al. | 192/111 A X |
| 3,433,341 | 3/1969 | Bohn et al. | 192/111 A |
| 3,478,853 | 11/1969 | Kraeplin | 192/111 A |
| 4,086,996 | 5/1978 | Gatewood | 192/111 A |
| 4,109,773 | 8/1978 | Higgerson et al. | 192/98 X |
| 4,399,898 | 8/1983 | Olschewski et al. | 192/98 |
| 4,456,111 | 6/1984 | Limbacher | 192/91 A X |

FOREIGN PATENT DOCUMENTS

| 2524233 | 12/1976 | Fed. Rep. of Germany ... 192/111 A |
| 2923487 | 6/1979 | Fed. Rep. of Germany . |
| 1346974 | 2/1974 | United Kingdom ............. 192/91 A |

Primary Examiner—Rodney H. Bonck
Attorney, Agent, or Firm—Toren, McGeady, Stanger, Goldberg & Kiel

[57] ABSTRACT

A rotary clutch assembly is provided with a clutch release group. The clutch release group comprises a stator surrounding a torque transmission shaft in driving connection with one of the rotors of the rotary clutch assembly. A first bearing ring surrounds the torque transmission shaft. A toroidal membrane member is fixed with respect to the stator and acts onto the first bearing ring so as to axially displace the first bearing ring in response to pressure variation within the membrane. A second bearing ring is mounted for common axial movement with the first bearing ring and rotatable with respect thereto. The second bearing ring acts onto a clutch disengagement member rotating around the torque transmission shaft.

20 Claims, 6 Drawing Figures

CLUTCH RELEASE GROUP FOR A ROTARY CLUTCH ASSEMBLY

SUMMARY OF THE INVENTION

The present invention is directed to a clutch release group for a rotary clutch assembly.

The rotary clutch assembly comprises in short first rotor means and second rotor means for rotation about a common axis. First frictional engagement means and second frictional engagement means are provided on both rotor means, respectively. Spring means establish frictional engagement of said first and said second frictional engagement means. At least one torque transmission shaft extends along the axis and is connected for common rotation with one of the rotor means. At least one disengagement member is mounted for rotation about said torque transmission shaft with one of said rotor means and is axially displaceable in a first axial direction along said axis against the action of said spring means in view of disengagement of said frictional engagement means.

With such a rotary clutch assembly the clutch release group comprises stator means surrounding said torque transmission shaft. Further, the torque transmission shaft is surrounded by first ring means. Annular fluid-operated driving means are provided for axially displacing said first ring means with respect to said stator means. Second ring means are mounted for common axial movement with said first ring means and are rotatably mounted with respect to said first ring means. The second ring means act upon the disengagement member in response to axial displacement of the first ring means by the fluid-operated driving means.

Such a clutch release group is known from German Offenlegungsschrift No. 2,923,487. The fluid-operated driving means with this known construction is highly complicated and expensive.

Therefore, it is a primary object of the present invention to provide a clutch release group of the type specified above, which is of simplified and less expensive design.

A further object of this invention is to provide a highly reliable clutch release group even for long periods of operation.

A further object of this invention is to provide a clutch release group, in which separate axial guiding means for guiding the first ring means can be avoided, so as to further simplify the construction and reduce the expenses for manufacturing and assembling.

In view of at least part of said objects with a clutch release group as defined above, said fluid operated driving means comprise a flexible toroidal membrane member surrounding said torque transmission shaft and having radially inner substantially axially extending wall means, radially outer substantially axially extending wall means and first and second transition wall means adjacent respective axial ends of said radially inner and radially outer substantially axially extending wall means. A toroidal chamber is defined within said toroidal membrane member. Said toroidal chamber has different radial widths adjacent the first and second transition wall means, respectively. One of said substantially axially extending wall means is supported in axial direction by said stator means; the other one of said axially extending wall means acts upon said first ring means in view of axial movement thereof; said toroidal chamber is provided with fluid inlet means; variation of fluid pressure within said toroidal chamber effects axial movement of said other substantially axially extending wall means and said transition wall means with respect to said stator means such as to axially displace said first and second ring means and said disengagement member against the action of said spring means in view of disengagement of said frictional engagement means.

The clutch release group of this invention is particularly, but not exclusively intended for motor-vehicle clutches provided between e.g. an internal combustion engine and a gear box. The clutch release assembly is applicable to both the so-called pulled-type rotary clutch assemblies and the so-called pressed-type rotary clutch assemblies. The difference between these two types of rotary clutch assemblies will become apparent in the following particular description, where a pulled-type rotary clutch assembly is described by reference to the appended drawings as a matter of example.

This invention provides also a construction, in which the assembling of the rotary clutch assembly on the one hand, and the clutch release group on the other hand is considerably simplified, both in the motor-car manufacturing plant and in later replacement or repair operations. This is particularly true for the so-called pulled-type rotary clutch asssemblies, the assembling of which has been more complicated in the past as the assembling of pressed-type rotary clutch assemblies with the respective clutch release group.

Further, this invention provides a possibility of automatically adapting the clutch release group to the rotary clutch assembly when the frictional engagement means are worn during operation.

Further, this invention gives broad possibilities of varying the clutch release forces exerted by the clutch release group along the axial path of movement of the ring means occurring when the rotary clutch assembly is to be brought from the engaged condition to the disengaged condition. This variation of the clutch release forces is highly desirable in view of adaptation to the spring characteristices of the rotary clutch assembly and in view of the characteristics of a control unit associated to the clutch release group.

Even with a compact design of the clutch release group a considerable clutch release path of the ring means may be obtained.

The membrane member can be easily and with small expense manufactured from a cylindrical, flexible and/or elastic tube by refolding the axial end portions thereof and overlapping the refolded end portions. By such overlapping, the difference in radial width of the respective transition wall means is also achieved in a most economic way. No moving sealing arrangements are necessary. The number of the necessary components for the clutch release group is small. The clutch release group fulfils a damping function both with respect to radial and axial oscillations.

The membrane compensates for tolerances in manufacturing and assembling of the rotary clutch assembly and the clutch release group.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
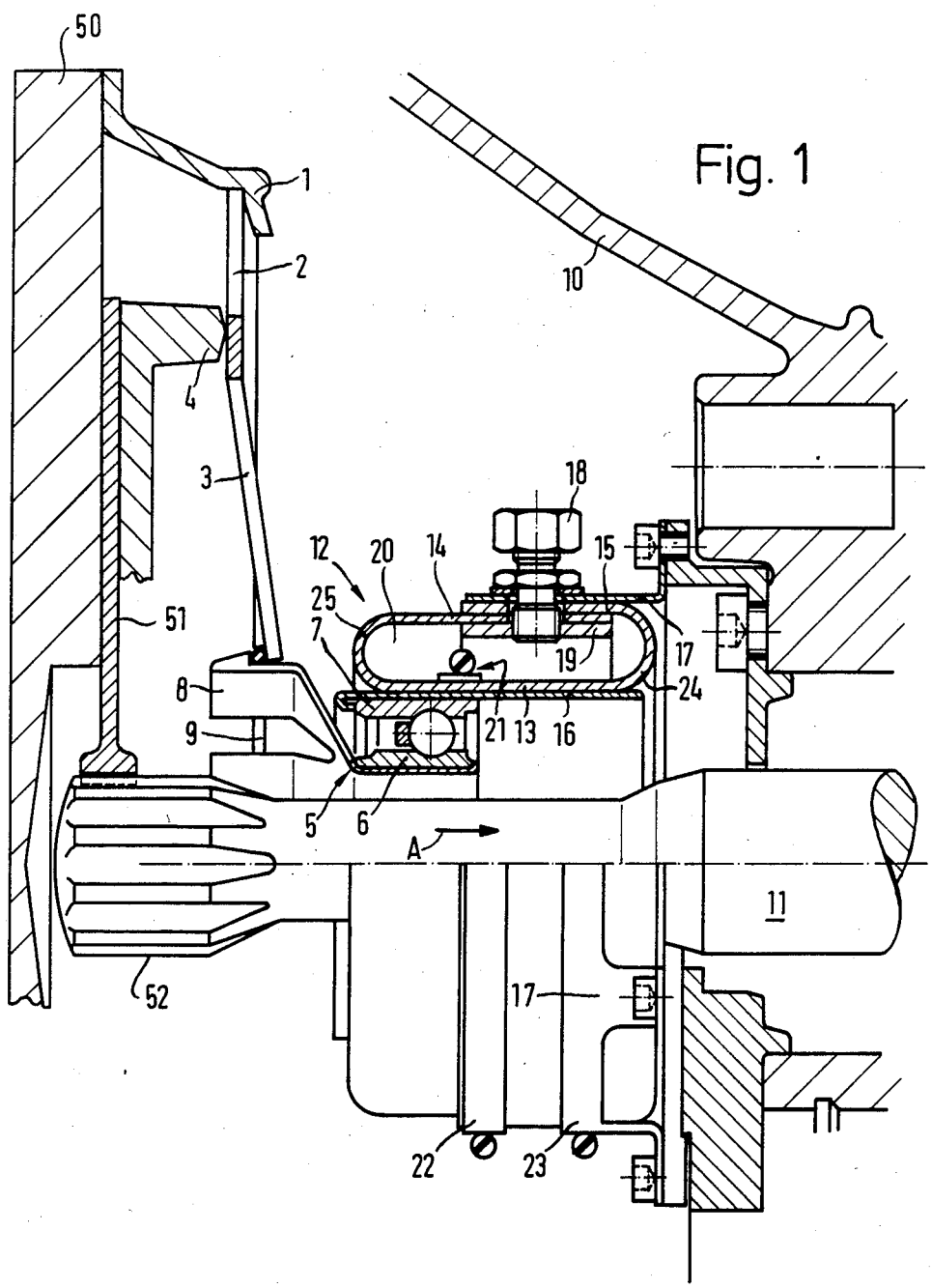
FIG. 1 is a cross-sectional view through the axis of the rotary clutch assembly and the clutch release group of this invention.

In FIG. 1 one recognizes the basic principle of the fluid-operated clutch release group of the invention in application to a pulled-type motor-vehicle rotary clutch assembly. The rotary clutch assembly comprises a driving disc 50, a clutch housing 1, a pressure plate 4 and a clutch disc unit 51. The pressure plate 4 is urged by a diaphragm spring 2 towards the driving disc 50, so that the clutch disc 51 is frictionally engaged between the driving disc 50 and the pressure plate 4. The clutch disc unit 51 is mounted on a torque transmission shaft 11 for common rotation therewith and is axially movable along said torque transmission shaft 11 by spline means 52. FIG. 1 shows the rotary clutch assembly in the engaged condition. The disengagement of the clutch assembly is achieved by displacing the tongues 3 of the membrane spring 2 to the right according to the arrow A. The engagement of the clutch assembly is performed by the spring action of the diaphragm spring 2 urging the pressure plate 4 to the left and engaging the clutch disc unit 51 between the driving disc 50 and the pressure plate 4. The torque transmission shaft 11 leads to a gear box, the housing of which is indicated by 10. A clutch release gear 5 surrounds the torque transmission shaft 11. The clutch release group 5 comprises a rotatable inner bearing ring 6 and a non-rotatable outer bearing ring 7. The bearing ring 6 is connected for common axial movement in the direction A with the radially inner ends of the tongues 3 by a force transmission sleeve 8 and a tongue engagement ring 9. The outer bearing ring 7 is provided with a tubular support member 16 which provides the mechanical connection with a toroidal membrane member 12. The toroidal membrane member 12 surrounds the tubular, substantially cylindrical support member 16. The toroidal membrane member comprises a radially inner wall 13, a radially outer wall 14, 15 and curved transition walls 24, 25. This toroidal membrane member is made from a tubular section of flexible and/or elastic material by folding the end portions 14 and 15 back into overlapping position as shown in FIG. 1. The end portions 14 and 15 are sealed with respect to each other along the overlapping area by radial pressure. The radial inner wall 13 is fixed with respect to the tubular support member 16 and the radially outer bearing ring 7 by a clamp ring as indicated at 21. The end portions 14 and 15 defining the radially outer wall 14, 15 are substantially concentric with respect to the radially inner wall 13. The end portion 15 is positioned radially outwardly of the end portion 14. Therefore, the radial width of the annular chamber 20 defined within the membrane 12 is larger adjacent the transition wall 24 as compared with the radial width adjacent the transition wall 25. When a pressurized fluid is admitted to the annular chamber 20, a resulting force acts onto the membrane member in the direction indicated by the arrow A due to the larger radial width of the chamber 20 adjacent the transition wall 24. The radially outer wall 14, 15 is axially supported by a tubular support member 17 which is fixed with respect to the gear box casing 10 and forms part of a stator. This tubular support member is made by a sheet metal tube concentric with respect to the axis. The end portions 14, 15 defining the radially outer wall 14, 15 are clamped between a clamping support ring 19 housed within the annular chamber 20 and clamp rings 22, 23. At least the clamp ring 23 is integral with the tubular support member 17. The clamp rings 22, 23 are adjustable in diameter as known in the art, so as to radially press the end portions 14, 15 against the clamping support ring 19. The clamp ring 22 is provided adjacent the free edge of the end portion 15 and the clamp ring 23 is provided axially adjacent the free edge of the end portion 14. Axially between the clamping rings 22, 23 a pressure fluid connection member 18 is provided which passes through the end portions 14, 15 and the clamping support ring 19. Pressure fluid may be admitted through the pressure fluid connection member 18 from a source of pressurized fluid not shown.

The operation of the clutch release group is as follows:

In FIG. 1 the rotary clutch assembly is illustrated in the engaged condition. When pressurized fluid is admitted through the pressure fluid connection member 18 into the annular chamber 20, a resulting force acting onto the membrane member 12 occurs, which is directed to the right in FIG. 1 according to the arrow A. As the radially outer wall 14, 15 of the membrane member 12 is fixed to the tubular support member 17, i.e. with respect to the stator and with respect to the gear box housing 10, the radial inner wall 13 of the membrane member 12 transmits an axially directed force in the direction A to the tubular support member 16 through the clamp ring 21, this force being transmitted to the radially outer bearing ring 7. This force is further transmitted to the radially inner bearing ring 6 and by the sleeve member 8 and the ring member 9 also to the radial inner ends of the tongues 3 of the membrane spring 2. The transition wall means 24 and 25 are revolved along the tubular support members 17 and 16. The outer contour of the membrane 12 is displaced in axial direction only by one half of the axial path of movement of the radial inner wall. The axial path of movement of the radial inner wall corresponds to the effective clutch disengagement path of the rings 6 and 7 and the radial inner ends of the tongues 3. So for a predetermined axial clutch disengagement path the space required for accomodating the contour of the membrane member 12 is very small. When the pressure within the chamber 20 is relieved the tongues 3 of the membrane spring 2 return to the left due to their inner tension and take the bearing rings 6, 7 and the tubular support member 16 with the radial inner wall 13 of the membrane member 12 also to the left. When the pressure within the annular chamber 20 becomes zero the rotary clutch assembly is again in the fully engaged condition.

Figure 2:
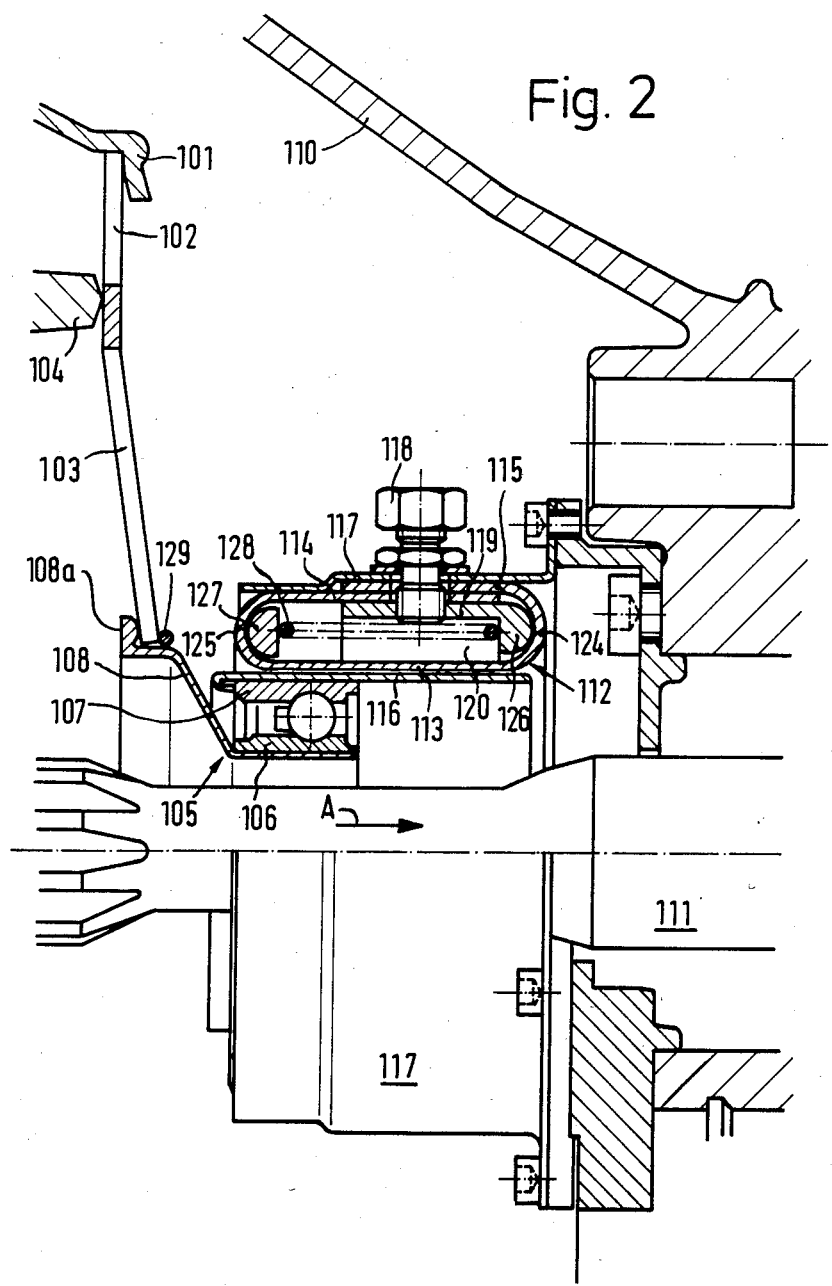
FIG. 2 is a section similar to FIG. 1 with a modified embodiment.

FIG. 2 shows a construction similar to that of FIG. 1, analogous parts being designated by the same reference numbers as in FIG. 1, however, increased by 100. In the following, only the differences with respect to FIG. 1 are described. Also in FIG. 2 there is shown a so-called pulled-type rotary clutch assembly. The term pulled-type results from the fact that the sleeve member 108 exerts a pulling action onto the tongues 103. In contradiction to FIG. 1 the radially inner wall 113 of the tube 112 is not positively fixed to the tubular support member 116. Only in response to increased pressure within the annular chamber 120 the radially inner wall 113 frictionally engages the tubular support member 116. The clamping support ring 119 is provided with a transition wall support member 126. This transition wall support member 126 is engaging the transition wall 124 when the membrane member 112 is in its leftmost position as shown in FIG. 2. This engagement is achieved by a biasing spring 128, which on the one hand is supported by the stationary transition wall support member 126, and on the other hand acts onto an axially movable transition wall support member 127. The transition wall supoort meter 127 engages the transition wall 125. Due to the action of the biasing spring 128 the radius of the radial inner wall 113 is increased when there is no or only small pressure within the annular chamber 120. So the radial inner wall 113 of the membrane member 112 is lifted from the tubular support member 116 and the frictional contact between the radially inner wall 113 and the tubular support member 116 is omitted. It is to be noted that in FIG. 2 the rotary clutch assembly is in its fully engaged condition, i.e. the radially inner ends of the tongues 103 are in their leftmost position. Also the sleeve member 108 and the bearing rings 107 and 106 with the tubular support member 116 are in their leftmost positions corresponding to the engagement condition of the rotary clutch assembly. Moreover, the membrane member 112 is in its leftmost position due to the biasing action of the biasing spring 128.

When pressurized fluid is admitted to the annular chamber 120 the radially inner wall 113 of the membrane member 112 engages the tubular support member 116. Moreover, the membrane member 112 is displaced to the right as seen in FIG. 2, the transition wall 124 being lifted from the transition wall support member 126 and the transition wall 125 sliding around the transition wall support member 127 and urging the transition wall support member 127 to the right against the action of the biasing spring 128.

When the pressure in the annular chamber 120 is reduced again the tongues 103 return to the left and also the membrane member 112 returns to the position as shown in FIG. 2. If the frictional engagement means in the rotar clutch assembly are worn, i.e. if the effective thickness of the clutch disc unit 51 as shown in FIG. 1 is reduced, the tongues 103 take a position more to the left than shown in FIG. 2 and the same is true for the axial position of the tubular support member 116. The membrane member 112, however, always returns to the position as shown in FIG. 2, this position being defined by the engagement of the transition wall 124 with the transition wall support member 126. It results from the foregoing that in case of reduction of the effective thickness of the clutch disc unit 51 as shown in FIG. 1, the relative position of the radially inner wall 113 of the membrane member 112 with respect to the tubular support member 116 and with respect to the bearing rings 106, 107 is changed and this change represents an automatic compensation of the reduction of effective thickness of the clutch disc unit 51. With other words, even after the effective thickness of the clutch disc unit 51 has been reduced by wear, the axial path of the tongues 103 with respect to the driving disc 50 occurring on transition from the engaged condition to the disengaged condition of the rotary clutch assembly remains constant. This is a considerable advantage of the embodiment as shown in FIG. 2.

It is to be noted that in case of the radially inner wall engaging the tubular support member 116 only by friction in response to pressure increase within the annular chamber 120, care should be taken that the membrane member 112 returns to its terminal position, as shown in FIG. 2 by membrane biasing means. The biasing spring 128 is only one example of such membrane biasing means and by no means limitative. It is well possible that the membrane biasing means are defined by the structure of the membrane 112 itself. There may exist an inner stress within the membrane member 112 which returns the membrane member 112 into the position as shown in FIG. 2 in response to decrease of pressure within the annular chamber 120.

A further advantage of the frictional engagement between the radially inner wall 113 and the tubular support member 116 concerns the assembling of the construction as shown in FIG. 2. One recognizes that the assembling of a pulled-type rotary clutch assembly as shown in FIG. 2 is relatively complicated, because the abutment ring 108a must be brought into engagement with the left-hand side of the tongues 103 and because the wire ring 129 must be mounted. This is in contradiction to the so-called pressed-type rotary clutch assemblies, in which a member comparable to the sleeve 108 is provided and presses onto clutch disengagement levers in a direction against the arrow A of FIG. 2.

When assembling the construction as shown in FIG. 2, the bearing rings 106, 107 and the tubular support member 116 may be preassembled with the tongues 103, i.e. with the rotary clutch assembly and it is only necessary to slide the membrane member 112 over the tubular support member 116 in the final assembling operation. It results therefrom that the assembling of the construction as shown in FIG. 2 is easily performable, because it is not necessary to apply considerable forces during assembling and also because no fixing elements must be mounted after the different elements, as shown in FIG. 2, have been brought into the relative position as illustrated there.

It is also to be noted that in the embodiment of FIG. 2 the tubular support member 117 has been extended to the left so as to cover the radially outer wall 114, 115 along its total axial length.

FIGS. 3 to 6 show the membrane and the tubular support members 16, 17 in a diagrammatic way with various profiles of the tubular support member 17 along the axis.

Figure 3:
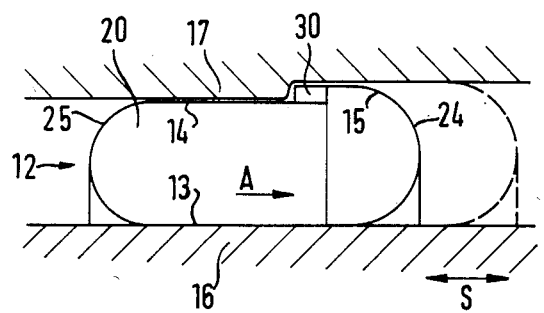
FIGS. 3 to 6 show various forms of membrane supporting profiles together with the respective characteristics of the clutch disengagement force in dependency of the axial clutch disengagement path of the ring means.
Figure 3:
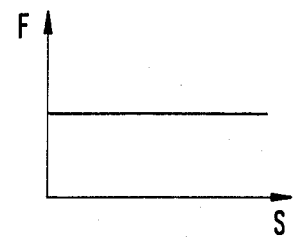

The embodiment of FIG. 3 substantially corresponds to the embodiment of FIGS. 1 and 2. The membrane comprises again the radially inner wall 13, the radially outer wall 14, 15 and the transition walls 24, 25. The membrane member 12 is again established by a tube section, the axial end portions 14, 15 of which have been folded back and are overlapped. The radial width of the annular chamber 20 is larger adjacent the transition wall 24 than adjacent the transition wall 25. Therefore, on admission of pressurized fluid to the annular chamber 20 the membrane member 12 is moved to the right in FIG. 3 in the direction A into the position as indicated by dotted lines. The path of movement is indicated by S. The force acting in the direction A is a product of the pressure within the annular chamber 20 and the difference in the axial projection faces depending from the difference in radial width adjacent the transition wall 24 and adjacent the transition wall 25. Assuming a constant pressure within the annular chamber 20, this force remains constant along the total path S, because also the difference of the radial width adjacent the transition wall 24 and adjacent the transition wall 25 remains constant due to the substantially cylindrical profiles of the tubular support members 16 and 17. The characteristic of this force F in dependency of the path S is shown in the diagram at the right-hand side of FIG. 3. The difference of the radial widths adjacent the transition walls 24 and 25 is indicated at 30 and corresponds to the overlapping.

Figure 4:
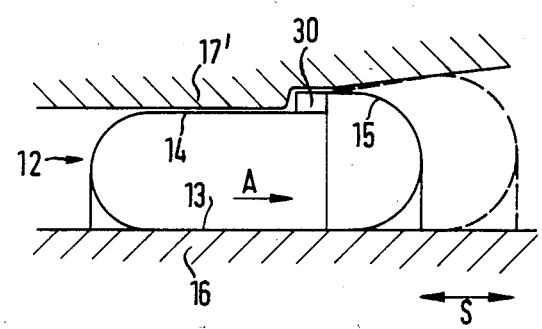
Figure 4:
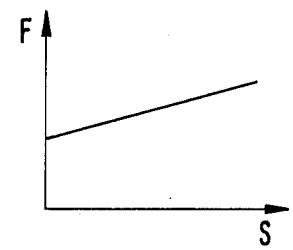

According to FIG. 4 the profile of the tubular support member 17' is conical at the right-hand end portion thereof. Due to this conical profile the force F is increasing along the path S, as can be seen from the right-hand diagram in FIG. 4.

Figure 5:
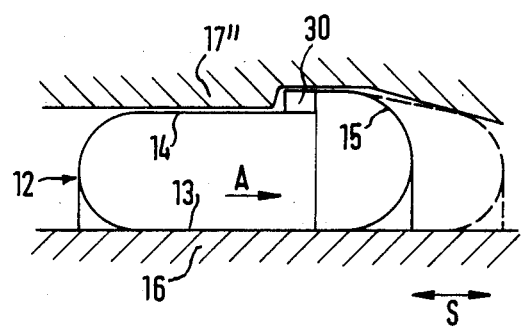
Figure 5:
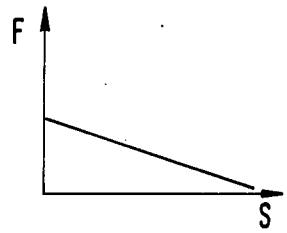

According to FIG. 5 the tubular support member 17" has a conical profile converging to the right. According to this profile the force F decreases along the path S.

Figure 6:
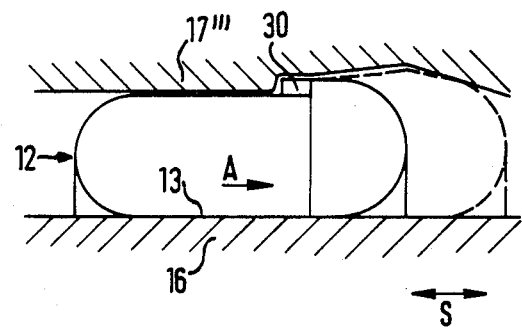
Figure 6:
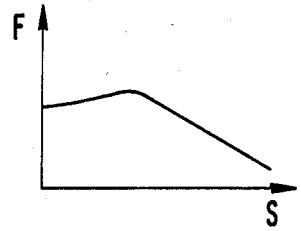

According to FIG. 6 the tubular support member 17'" has a divergent and convergent profile, so that the force F, as shown in the diagram of FIG. 6, initially increases and decreases thereafter.

It is to to understood that FIGS. 3 to 6 only show examples of supporting profiles. It is also possible that the profile of the tubular support member 16 is varied along the axis.

While specific embodiments of the invention have been shown and described in detail to illustrate the application of the inventive principle, it will be understood that the invention may be embodied otherwise without departing from such principles. It is further to be noted that the reference numbers used in the following claims are only used for a better understanding of the claims and are by no means limitative.

What is claimed is:

1. In a clutch release group for a rotary clutch assembly said rotary clutch assembly comprising
(1) first rotor means (50, 1, 4) and second rotor means (51) for rotation about a common axis;
(2) first frictional engagement means and second frictional engagement means mounted for common rotation with said first rotor means (50, 1, 4) and said second rotor means (51), respectively;
(3) spring means (2) establishing frictional engagement of said first and second frictional engagement means;
(4) at least one torque transmission shaft (11) extending along said axis and connected for common rotation with one (51) of said rotor means (50, 1, 4; 51), and
(5) at least one disengagement member (3) mounted for rotation about said torque transmission shaft (11) with one (50, 1, 4) of said rotor means (50, 1, 5; 51) and being axially displaceable in a first axial direction (A) along said axis against the action of said spring means (2) in order to disengage said frictional engagement means;

said clutch release group comprising
(a) stator means (17) surrounding said torque transmission shaft (11);
(b) first ring means (7, 16) surrounding said torque transmission shaft (11);
(c) annular fluid operated driving means (12, 18) for axially displacing said first ring means (7, 16) with respect to said stator means (17);
(d) second ring means (6, 8, 9) mounted for common axial movement with said first ring means (7, 16) and rotatably mounted with respect to said first ring means (7, 16), said second ring means (6, 8, 9) acting upon said disengagement member (3) in response to axial displacement of said first ring means (7, 16) by said fluid operated driving means (12, 18); the improvement comprising that said fluid operated driving means (12, 18) comprise a flexible toroidal membrane member (12) surrounding said torque transmission shaft (11) and having radially inner substantially axially extending wall means (13), radially outer substantially axially extending wall means (14, 15) and first and second transition wall means (24, 25) adjacent respective axial ends of said radially inner and radially outer substantially axially extending wall means (13; 14, 15), a toroidal chamber (20) being defined within said toroidal membrane member (12), said toroidal chamber (20) having different radial widths adjacent said first and second transition all means (24, 25), respectively, one (14, 15) of said substantially axially extending wall means (13; 14, 15) being supported in axial direction by said stator means (17), the other one (13) of said axially extending wall means (13; 14, 15) acting upon said first ring means (7, 16) in order to obtain axial movement thereof, said toroidal chamber (20) being provided with fluid inlet means (18), variation of fluid pressure within said toroidal chamber (20) effecting axial movement of said other substantially axially extending wall means (13) and said transition wall means (24, 25) with respect to said stator means (17) such as to axially displace said first and second ring means (7, 16; 6, 8, 9) and said disengagement member (3) against the action of said spring means (2) in order to disengage said frictional engagement means.

2. A clutch release group as set forth in claim 1, wherein said radially outer substantially axially extending wall means (14, 15) are supported in axial direction by said stator means (17).

3. A clutch release group as set forth in claim 1, wherein said first transition wall means (24) are leading in said first axial direction (A) and said second transition wall means (25) are trailing in said first axial direction (A), the radial width of said toroidal chamber (20) being larger adjacent said first transition wall means (24).

4. A clutch release group as set forth in claim 1, wherein the radial distance of the radial inner face of said radially outer substantially axially extending wall means (14, 15) with respect to said axis varies along said axis between said first and second transition wall means (24, 25).

5. A clutch release group as set forth in claim 1, wherein said toroidal membrane member (12) is established by a tube section, tne axial end portions (14, 15) of said tube section being folded back and overlapping each other, the difference of said radial widths being established by said overlapping.

6. A clutch release group as set forth in claim 5, the axial end portions (14, 15) of said tube section being folded back in radial outward direction.

7. A clutch release group as set forth in claim 1, at least one of said radially outer wall means (14, 15) and said radially inner wall means (13) being substantially radially supported over at least part of their respective axial lengths by substantially axially extending membrane support means (17, 23; 16) provided outside said annular chamber (20).

8. A clutch release group as set forth in claim 7, wherein first membrane support means (17, 23) are fixed with respect to said stator means (17).

9. A clutch release group as set forth in claim 8, wherein second membrane support means (16) are fixed with respect to said first ring means (7, 16).

10. A clutch release group as set forth in claim 7, said membrane support means (17, 23; 16) having such a profile along said axis as to maintain the radial widths of said toroidal chamber (20) substantially constant adjacent said transition wall means (24, 25) on axial displacement of said transition wall means (24, 25).

11. A clutch release group as set forth in claim 7, said membrane support means (17, 23; 16) having such a profile along said axis as to vary said radial widths adjacent at least one (24) of said transition wall means (24, 25) in response to axial displacement of said transition wall means (24, 25).

12. A clutch release group as set forth in claim 5, wherein said overlapping axial end portions (14, 15) are commonly fixed with respect to said stator means (17) by first clamping means (22, 23, 19).

13. A clutch release group as set forth in claim 12, wherein said first clamping means (22, 23, 19) comprise at least one first clamping support ring (19) within said annular chamber (20) and at least one clamp ring (22, 23) of adjustable diameter outside said annular chamber (20) and fixed with respect to said stator means (17).

14. A clutch release group as set forth in claim 1, wherein said other substantially axially extending wall means (13) are axially fixed with respect to said first ring means (7, 16).

15. A clutch release group as set forth in claim 14, wherein said other substantially axially extending wall means (13) are clamped to said first ring means (7, 16) by second clamp means (21, 16).

16. A clutch release group as set forth in claim 1, wherein said other substantially axially extending wall means (13) are engageable with said first ring means (7, 16) in response to variation of fluid pressure within said annular chamber (20).

17. A clutch release group as set forth in claim 16, wherein said toroidal membrane member (112) is biased by membrane biasing means (126, 127, 128) towards a terminal position corresponding to respective terminal positions of said disengagement member (103) and said ring means (107, 113; 106, 108, 129) occurring, when said frictional engagement means engage each other.

18. A clutch release group as set forth in claim 17, wherein said membrane biasing means (126, 127, 128) are provided within said annular chamber (120) and supported in axial direction by said stator means (117).

19. A clutch release group as set forth in claim 18, wherein said biasing means (126, 127, 128) comprise a first transition wall support member (126) engaging one (124) of said transition wall means (124, 125) and fixed with respect to said stator means (117) and a second transition wall support member (127) engaging the other (125) of said transition wall means (124, 125) and biasing spring means (128) extending in axial direction between said first and said second transition wall support members (126, 127).

20. A clutch release group as set forth in claim 17, wherein said membrane biasing means are provided by the structure of said toroidal membrane member (112), said structure providing internal stresses within said membrane member for resisting axial displacement of said toroidal membrane member (112) with respect to said stator means (117) in at least one axial direction.

* * * * *